(12) United States Patent
Schuler et al.

(10) Patent No.: US 9,091,300 B2
(45) Date of Patent: Jul. 28, 2015

(54) ROLLING-ELEMENT BEARING

(71) Applicants: Matthias Schuler, Stadtlauringen (DE); Volker Wendt, Üchtelhausen/Zell (DE)

(72) Inventors: Matthias Schuler, Stadtlauringen (DE); Volker Wendt, Üchtelhausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/198,996

(22) Filed: Mar. 6, 2014

(65) Prior Publication Data

US 2014/0314359 A1     Oct. 23, 2014

(30) Foreign Application Priority Data

Mar. 6, 2013   (DE) .................. 10 2013 203 828

(51) Int. Cl.
    *F16C 33/66*    (2006.01)
    *F16C 19/36*    (2006.01)
    *F16C 33/46*    (2006.01)

(52) U.S. Cl.
    CPC ............. *F16C 33/6651* (2013.01); *F16C 19/36* (2013.01); *F16C 33/46* (2013.01); *F16C 33/66* (2013.01)

(58) Field of Classification Search
    CPC .................................................. F16C 33/6651
    See application file for complete search history.

(56) References Cited

U.S. PATENT DOCUMENTS

| | | | |
|---|---|---|---|
| 4,722,617 A | 2/1988 | Stella et al. | |
| 4,932,500 A * | 6/1990 | Smith et al. | ................... 384/470 |
| 8,746,983 B2 * | 6/2014 | Mitchell et al. | ............... 384/470 |
| 2008/0075400 A1 * | 3/2008 | Sekimoto et al. | ............. 384/470 |
| 2009/0028486 A1 | 1/2009 | Sada et al. | |

FOREIGN PATENT DOCUMENTS

| | | |
|---|---|---|
| DE | 2419944 | 11/1975 |
| DE | 3824125 | 1/1989 |
| JP | H10-89352 | 4/1998 |
| JP | 2008-298105 | 12/2008 |
| JP | 2009-192069 | 8/2009 |
| JP | 2010-112473 | 5/2010 |
| JP | 2012-132546 | 7/2012 |
| JP | 2012-141050 | 7/2012 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A rolling-element bearing includes inner and outer rings, a cage with pockets disposed therebetween, and rolling elements respectively retained in the pockets. The cage has a guiding section extending along the axial length of the rolling elements. The distance between a radially-inner surface of the guiding section and the rotational axis of the bearing progressively decreases at least in sections along the axial direction of the rolling-element bearing from a point of the guiding section that is most distant from the rotational axis. A conveying section of the cage connects to that most-distant point and extends outside or away from the axial length of the rolling elements. The distance between a radially-inner surface of the conveying section and the rotational axis progressively decreases at least in sections in the axial direction away from the rolling elements. A lubricant collection channel is defined between the guiding section and the conveying section.

21 Claims, 2 Drawing Sheets

ROLLING-ELEMENT BEARING

CROSS-REFERENCE

This application claims priority to German patent application no. 10 2013 203 828.3 filed on Mar. 6, 2013, the contents of which are incorporated herein by reference.

TECHNICAL FIELD

The invention relates to a rolling-element bearing comprising a bearing inner ring and a bearing outer ring, wherein rolling elements are disposed between the bearing rings, wherein the rolling elements are retained by a cage, wherein the cage has a guiding section that extends over the axial extension of the rolling elements and whose distance from an axis of rotation of the rolling-element bearing progressively changes at least in sections in the direction of the axis of rotation.

RELATED ART

A rolling-element bearing of the above-described type is known from JP 2009-192069 A. JP H10-89352 A, JP 2008-298105 A, JP 2010-112473 A, US 2009/0028486 A1, DE 38 24 125 A1, DE 24 19 944 A1, JP 2012-132546 A, and JP 2012-141050 A show similar solutions.

Cages of the above-mentioned type are used for example in tapered roller bearings. The annular guiding section has receiving pockets for the rolling elements. Due to the arrangement and geometry of the tapered rollers, a radially, continuously-increasing extension of the guiding section progressively results along the axis of rotation. This has the consequence that, due to the centrifugal force during the operation of the bearing, a conveying of lubricant towards the largest cage diameter results. Accordingly, accumulation of lubricant, in particular lubricating grease, often occurs in the region of the largest cage diameter. This is true in particular in the case of sealed bearings. Without external influences, the lubricant remains there unused.

To date, this problem is addressed in that a sufficiently large quantity of lubricant is introduced into the bearing so that said space is filled with grease and the grease accumulated and unused there can be tolerated. Only due to special and fortuitous circumstances, such as vibrations or bearing stoppages, can possibly heated and liquefied lubricant grease again reach the region of the rolling contact and thus be usable.

SUMMARY

It is an object to design a rolling-element bearing in such a manner that the above-mentioned problem is reduced or eliminated. Accordingly, the lubricating properties by the lubricant should be improved, wherein the lubricant should be used more efficiently.

In particular, the temporal use of the lubricant should be able to be extended by more lubricant being able to come into use.

In a first aspect of the present teachings, a conveying section (retaining section) connects to the point of the guiding section of the cage that is most distant from the axis of rotation. The conveying section (retaining section) extends outside the axial extension of the rolling elements. The distance between the conveying section (radially inward or radially outward, or even both radially inward and radially outward) and the axis of rotation progressively decreases at least in sections in the direction of the axis of rotation away from the rolling elements, so that a collection channel is defined in the axial region between the guiding section and the conveying section. Pockets configured to receive the rolling elements are formed in the cage, and these pockets are bounded at the point of the guiding section that is most distant from the axis of rotation by a bounding surface facing towards the rolling elements, which bounding surface lies opposite an axial end side of the rolling element.

The bounding surface here lies opposite the end side of the rolling element, preferably while forming a gap. The gap preferably has a constant value over the radial extension; the gap thickness here preferably falls between 0.1 mm and 2.0 mm.

The conveying section is preferably formed cone-shaped. It can extend at an angle to the axis of rotation, which angle preferably falls between 10° and 30°.

The conveying section is preferably formed one-piece from the material of the cage.

The cage preferably has a substantially constant thickness. It is preferably comprised of a metal plate part, in particular of steel plate. However, it can also be provided that the cage is comprised of plastic.

The axial extension of the conveying section is preferably between 10% and 30% of the axial extension of the guiding section.

Tapered roller bearings are the preferred application of the proposed concept; but the inventive design can also be used, for example, in angular contact ball bearings.

In an advantageous manner, an improved lubrication of the rolling elements, in particular of the rolling elements, results with the use of the inventive concept.

In the proposed design the lubricant, in particular the lubricating grease, is available in increased quantity at the regions of the roller end side which are critical in terms of lubrication engineering, and also at the guide flange during rotation of the roller, which makes possible an improved lubrication.

Because the receiving pocket at the point of the guiding section that is most distant from the axis of rotation is bounded by a bounding surface facing towards the rolling element, which bounding surface lies opposite an axial end side of the rolling element—preferably forming a gap of constant size—it is achieved that grease that that contacts the radially inner side of the conveying section, as well as grease that contacts the radially outer side of the conveying section, is conveyed by the centrifugal force towards the end side of the rolling element and thus conveyed back into the region of the rolling elements.

Due to the formed collection- or accumulating-channel for lubricant, a faster lubricant film development can also be promoted at low speeds. This in turn allows the region of the mixed friction on the guide flange, and thus the heating of the bearing, to be reduced in an advantageous manner.

Said collection channel is formed on the inner side of the cage. However, the conical shape of the cage, and in particular of the cage conveying section (cage retaining section), forming in this respect on the outer side also has the advantageous result that, due to the cage rotation and the resulting centrifugal forces, even lubricant adhering on the outer side of the cage is conveyed back into the region of the rolling elements, and namely into the region of the roller end side, and the lubrication is thus improved.

Since the lubricant is now used more efficiently, a reduction in the amount of lubricant located in the bearing can also be envisaged. The advantage here—besides economic aspects—is a reduction of churning action, which in turn reduces the heating of the bearing. Thus the operating life of the lubricating grease can also be increased.

BRIEF DESCRIPTION OF THE DRAWINGS

An exemplary embodiment of the invention is depicted in the drawings.

DETAILED DESCRIPTION OF THE INVENTION

Figure 1:
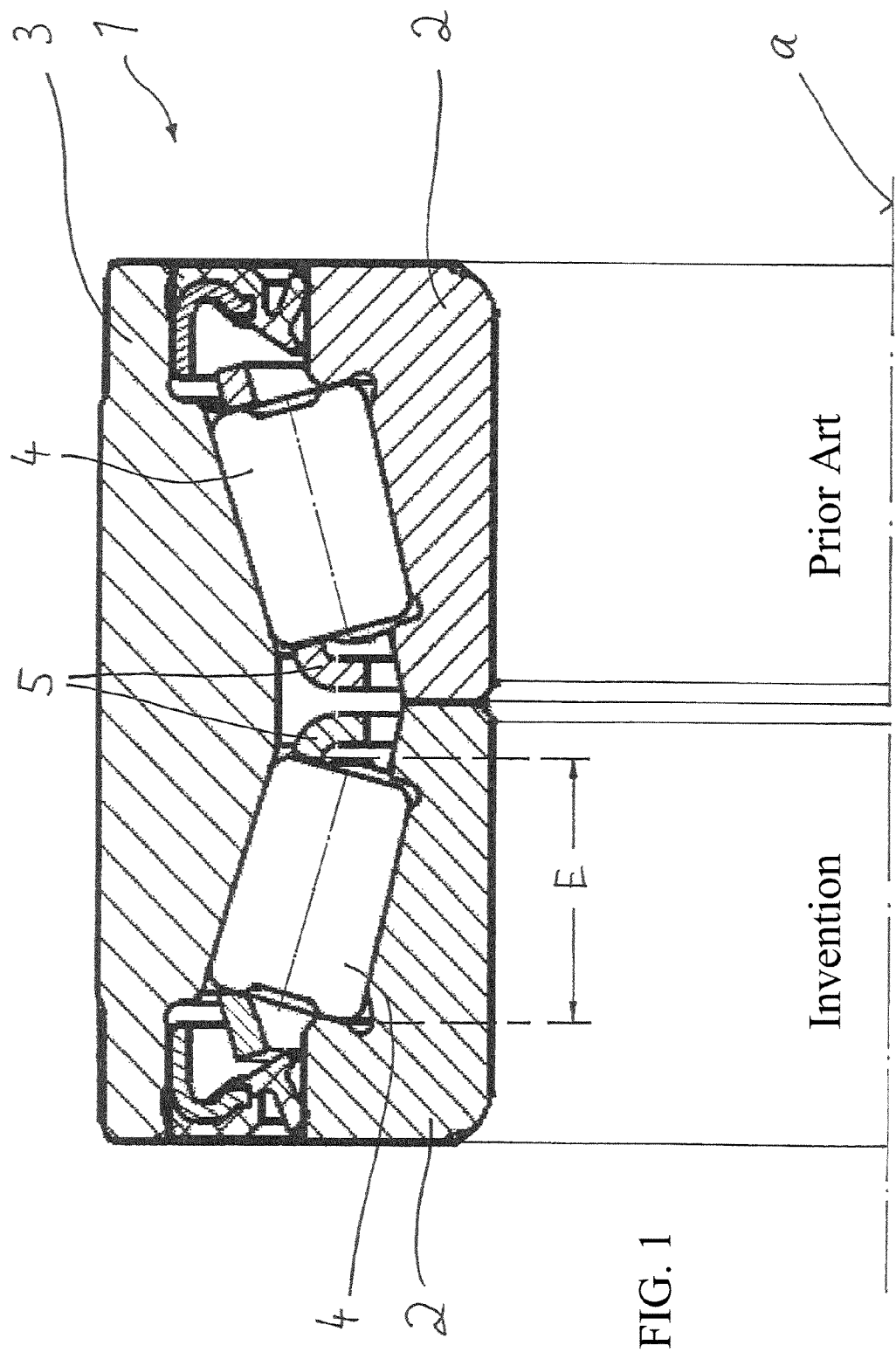
FIG. 1 shows, in radial section, a double row tapered roller bearing, wherein the right-side bearing is equipped with a cage according to the prior art and the left-side bearing is equipped with an inventive cage.

In FIG. 1 a rolling-element bearing 1 in the form of a double row tapered roller bearing is illustrated. Here the right-side bearing shows a design according to the prior art, while the left-side bearing is formed according to the invention. The bearing 1 has two bearing inner rings 2 and a bearing outer ring 3 present, between which are disposed tapered rollers 4. The tapered rollers 4 are retained in a known manner by a cage 5. The rolling-element bearing 1 has an axis of rotation a.

The right-side tapered roller bearing shows, as stated, the solution according to the prior art. It can be seen that the cage steadily increases in its diameter towards an end side of the tapered rollers 4 (i.e. towards the right). The lubricating grease for lubrication can flow away freely in the right axial end region of the cage 5 of the right-side tapered roller bearing and adversely accumulate in a "dead space." During rotation of the bearing, the resulting centrifugal force has the adverse effect that the above-mentioned accumulation of grease in the "dead space" is promoted.

The present invention therefore provides a design as the left-side tapered roller bearing according to FIG. 1 shows. The design of the cage 5 is decisive. Details of the cage 5 are clear in particular from FIG. 2 (in this Figure the cage 5 can be seen in radial section; the rolling element 4 is drawn with dash-dotted lines).

The cage has a known guiding section 6 as the central part, which guiding section 6 is provided with receiving pockets 10 for the tapered rollers 4. The guiding section 6 has an axial extension c that is only slightly greater than the axial extension E of the rolling elements 4. Furthermore it can be seen that, along the axis of rotation a, the guiding section 6 radially distances itself gradually from the axis of rotation a; the particular distance from the axis of rotation a is indicated by r. That is, there is a most-distant point 7 of the guiding section 6 from the axis of rotation a, which point 7 lies in the region of an end side of the tapered roller 4.

It is now provided that a conveying section 8 connects to said most-distant point 7 of the guiding section 6. This conveying section 8 extends outside the axial extension E of the rolling elements 4. The distance r of this conveying section 8 from the axis of rotation a progressively decreases in the direction of the axis of rotation a away from the rolling elements 4. Accordingly, a collection channel 9 for lubricant forms in the axial region between the guiding section 6 and the conveying section 8.

As can further be seen, at the most distant point 7 of the guiding section 8 from the axis of rotation a, the receiving pocket 10 is bounded by a boundary surface 11 facing towards the rolling element 4. This lies opposite the one axial end side 12 of the rolling element 4. One can therefore say that the conical structure of the conveying section 8 reaches directly up to the end side 12 of the rolling element 4. It can be recognized that a gap s is present between the boundary surface 11 and the end side 12 of the rolling element 4.

In the exemplary embodiment, the conveying section 8 is formed—which however is not mandatory—as a cone-shaped structure. The cone section extends at a (cone) angle α to the axis of rotation a, which presently falls at approximately 20°. It should be noted that the conveying section 8 need not necessarily have a conical shape in the manner illustrated. It is also possible that the outer cone angle $\alpha_1$ deviates from the inner cone angle $\alpha_2$.

As can be seen, the cage 5—formed as a metal plate part or as a plastic part—has a constant thickness d.

For the axial extension b of the conveying section 8, a value that falls at approximately 25% of the axial extension c of the guiding section 6 has been proven itself to be expedient.

The inventive design of the cage 5 thus employs an inwardly bent section (conveying section 8) which begins at the largest diameter of the cage 5. In this way, on the one hand grease conveyed to the radially-inner-lying surface of the cage is retained, and on the other hand grease which adheres to the cage 5 in the sealing region on the bend is conveyed back again towards the bearing raceway by the effect of the centrifugal force.

Due to this design of the conveying section 8 having the small gap s, which conveying section 8 reaches the end side 12 of the rolling element 4, lubricant which adheres both radially inward and radially outward at the conveying section 8 is thus conveyed back to the region of the rolling element 4.

The conical raceway of the bearing outer ring 3 extends axially—as can be seen in FIG. 1, left side—at least somewhat over the boundary surface 11 in the region of the conveying section 8, so that flung-off grease is retained here and remains in the region of the rolling engagement of the bearing.

The position of the collection channel 9 can also be displaced somewhat farther to the right (in FIG. 2), so that the "bend," i.e. the collection channel 9, comes to lie in the region of the rolling element 4. It only remains significant that the boundary surface 11 in the guiding section 8 reaches directly up to the end side 12 of the rolling element, in order to lead radially-outward- and radially-inward-adherent lubricant back to the rolling engagement by centrifugal force.

Figure 2:
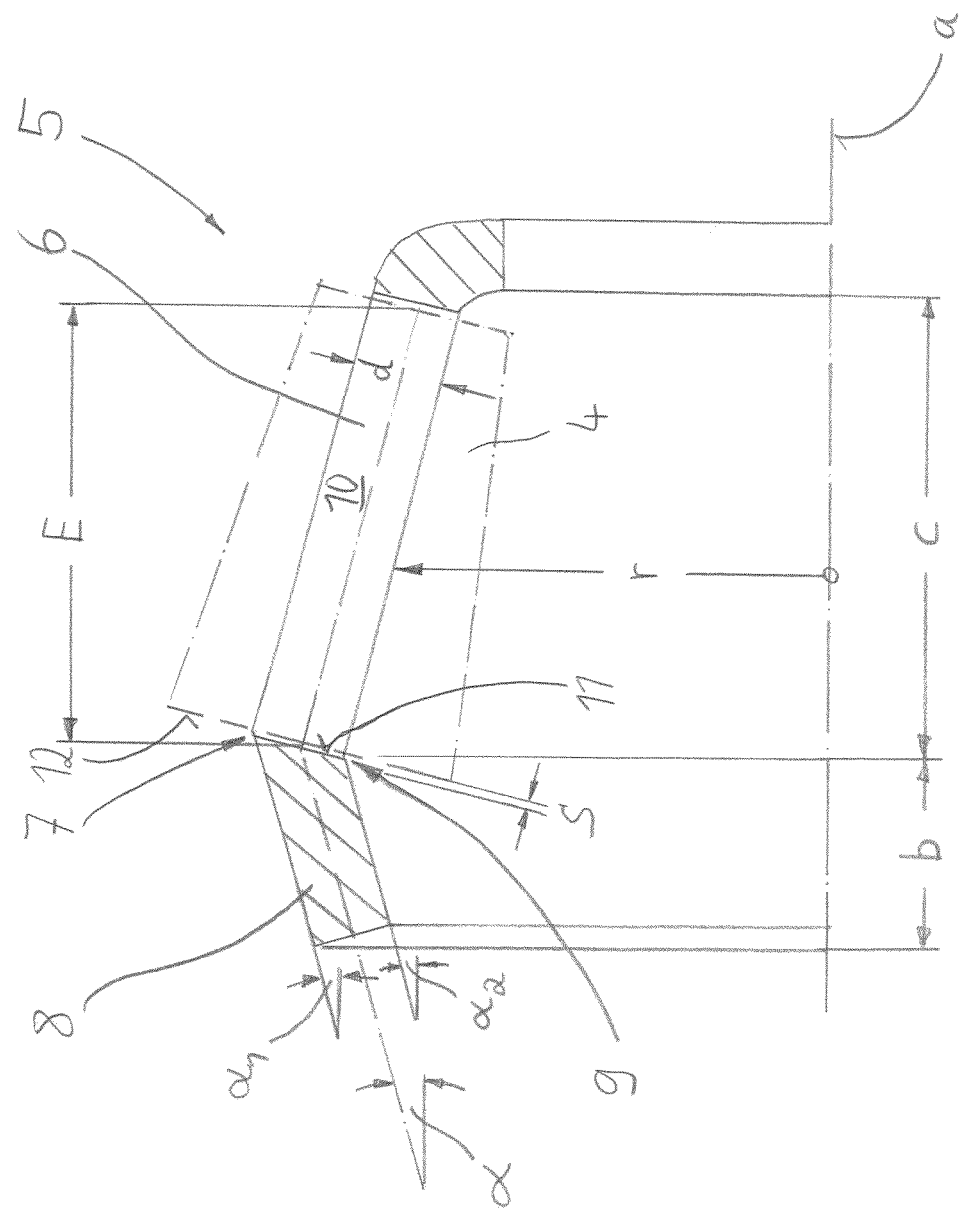
FIG. 2 shows, in radial section, the inventive cage of the left-side tapered roller bearing according to FIG. 1.

Usually—as in the exemplary embodiment according to FIG. 2—it is provided that the collection channel 9 or the point 7 comes to lie precisely in the region of the end side 12 of the rolling element 4. However it is also possible that the collection channel 9 or the point 7 comes to lie in the region of the axial extension of the rolling element 4, i.e. further right in FIG. 2. The point 7 or the collection channel 9 then therefore lies in the region of the axial extension of the guiding section 6.

REFERENCE NUMBER LIST

1 Rolling-element bearing
2 Bearing inner ring
3 Bearing outer ring
4 Rolling elements
5 Cage
6 Guiding section
7 Point
8 Conveying section (retaining section)
9 Collection channel
10 Receiving pocket
11 Boundary surface
12 Axial end side of the rolling element
E Axial extension of the rolling element
a Axis of rotation
b Axial extension of the conveying section c Axial extension of the guiding section
r Distance from the axis of rotation
d Thickness
s Gap
α angle
α₁ angle
α₂ angle

We claim:

1. A rolling-element bearing, comprising:
   a bearing inner ring,
   a bearing outer ring,
   a cage disposed between the bearing inner ring and the bearing outer ring, the cage having a plurality of pockets defined therein, and
   a plurality of rolling elements respectively retained in the pockets and disposed between the bearing inner ring and the bearing outer ring, the rolling elements each having an axial length,
   wherein the cage further has:
   a guiding section extending along the axial length of the rolling elements, a distance between a radially-inner surface of the guiding section and a rotational axis of the rolling-element bearing progressively decreasing at least in sections along an axial direction of the rolling-element bearing from a point of the guiding section that is most distant from the rotational axis,
   a conveying section connecting to the point of the guiding section that is most distant from the rotational axis, the conveying section extending outside the axial length of the rolling elements, wherein a distance between a radially-inner surface of the conveying section and the rotational axis progressively decreases at least in sections in the axial direction away from the rolling elements,
   at least one lubricant collection channels defined in an axial region between the guiding section and the conveying section and extending at least substantially in a radial direction of the rolling-element bearing, the radial direction being perpendicular to the axial direction, and
   a plurality of boundary surfaces respectively opposing axial ends of the rolling elements and respectively delimiting the cage pockets at the point of the guiding section that is most distant from the rotational axis.

2. The rolling-element bearing according to claim 1, wherein the at least one lubricant collection channel is defined by gaps between each of the boundary surfaces and each of the opposing axial ends of the rolling elements.

3. The rolling-element bearing according to claim 2, wherein the gaps each have a constant width in the radial direction of the rolling element-bearing.

4. The rolling-element bearing according to claim 3, wherein the width of the gaps is between 0.1 mm and 2.0 mm.

5. The rolling-element bearing according to claim 4, wherein the conveying section has an overall cone shape.

6. The rolling-element bearing according to claim 5, wherein an angle (α) formed by the radially-inner surface of the conveying section and the rotational axis is between 10° and 30°.

7. The rolling-element bearing according to claim 6, wherein the conveying section is formed as one-piece with a material of the cage.

8. The rolling-element bearing according to claim 7, wherein the cage has a substantially constant thickness.

9. The rolling-element bearing according to claim 8, wherein:
   the conveying section has an axial length,
   the guiding section has an axial length and
   the axial length of the conveying section is between 10% and 30% of the axial length of the guiding section.

10. The rolling-element bearing according to claim 9, wherein it is a tapered roller bearing with tapered rollers serving as the rolling elements or it is an angular contact ball bearing with balls serving as the rolling elements.

11. The rolling-element bearing according to claim 10, wherein the cage is comprised of a metal plate.

12. The rolling-element bearing according to claim 11, wherein the metal plate is a steel plate.

13. The rolling-element bearing according to claim 10, wherein the cage is comprised of plastic.

14. The rolling-element bearing according to claim 1, wherein the conveying section has an overall cone shape.

15. The rolling-element bearing according to claim 14, wherein an angle (α) formed by the radially-inner surface of the conveying section and the rotational axis is between 10° and 30°.

16. The rolling-element bearing according to claim 1, wherein the conveying section is formed as one-piece with a material of the cage.

17. The rolling-element bearing according to claim 1, wherein the cage has a substantially constant thickness.

18. The rolling-element bearing according to claim 1, wherein:
   the conveying section has an axial length,
   the guiding section has an axial length and
   the axial length of the conveying section is between 10% and 30% of the axial length of the guiding section.

19. The rolling-element bearing according to claim 1, wherein it is a tapered roller bearing with tapered rollers serving as the rolling elements or it is an angular contact ball bearing with balls serving as the rolling elements.

20. The rolling-element bearing according to claim 1, wherein the cage is comprised of a steel plate.

21. The rolling-element bearing according to claim 1, wherein the cage is comprised of plastic.

* * * * *